United States Patent Office.

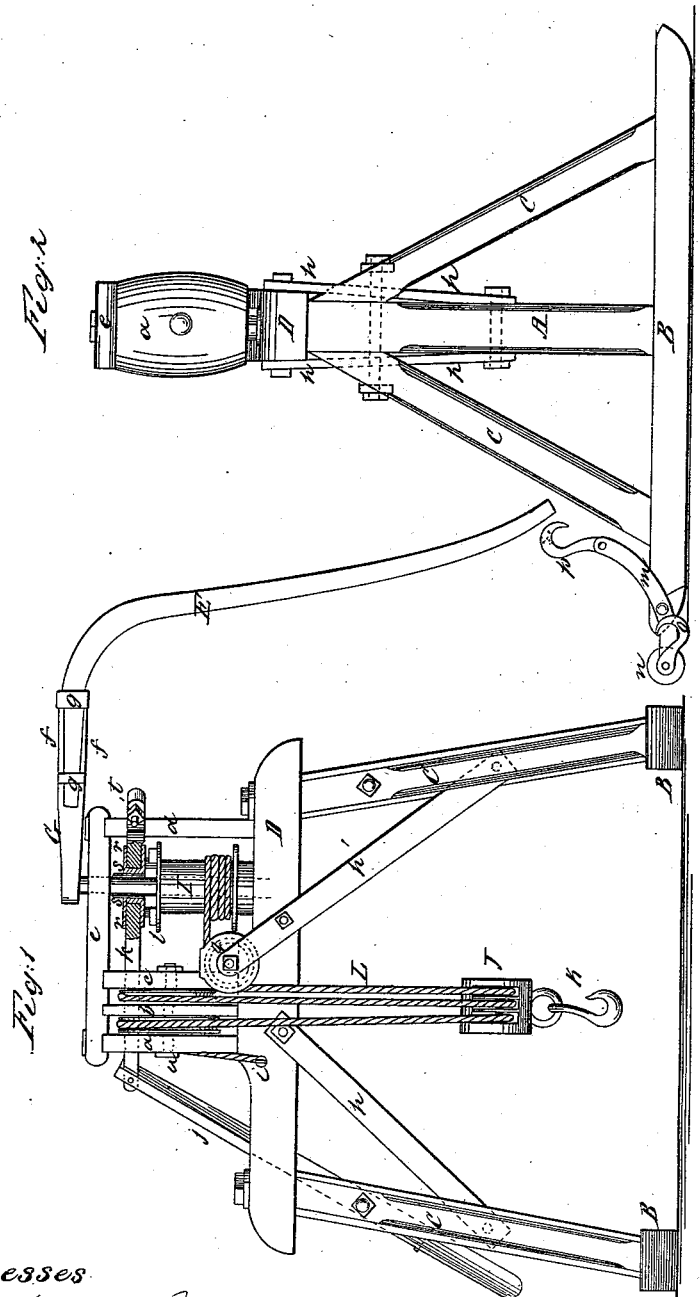

T. J. BOOTH, OF JEFFERSON LINE, PENNSYLVANIA.

Letters Patent No. 82,484, dated September 29, 1868.

---

IMPROVED STUMP-EXTRACTOR.

---

The Schedule referred to in these Letters Patent and making part of the same.

---

TO ALL WHOM IT MAY CONCERN:

Be it known that I, T. J. BOOTH, of Jefferson Line, in the county of Clearfield, and State of Pennsylvania, have invented a new and useful Improvement in Stump-Extractors; and I do hereby declare that the following is a full, clear, and exact description thereof, which will enable others skilled in the art, to make and use the same, reference being had to the accompanying drawings, forming part of this specification, in which—

Figure 1 is a side elevation of my invention.

Figure 2 is an end elevation of the same.

Similar letters of reference indicate like parts.

The object of this invention is to provide a simple and powerful machine for extracting stumps.

It consists of the combination and arrangement of the several principal features, as hereinafter set forth.

The stout trestle-frame, consisting of the base timbers B, uprights A, braces C, and main beam D, arranged as shown, constitutes the support for the movable parts, which are chiefly located on top of the said support.

The power-mechanism consists of the combination of a drum, sweep-bar, and tackle, arranged to operate in the manner set forth.

E is a sweep-bar, affixed to the upper end of the shaft of a drum, I, which has bearings in the beam D, and the top piece $e$ of the frame $a\ e\ d$, as shown.

The tackle consists of the block J, having two or more sheaves, and a corresponding number of sheaves revolving on the pin $u$, passing through the cheeks $a\ c$, which constitute the shell for the upper sheave, and also serve to sustain the top piece $e$, the said cheeks being affixed to the beam D and the said top piece, as shown.

One end of the rope or chain L is attached to some part of the machine, as $i$, and is rove on the upper and lower sheaves, as shown, thus bringing the last part of the rope or chain up and on a sheave in the shell $q$, affixed to the upper end of the iron brace $h'$, and thence affixed horizontally to the drum I, to which latter the end of the rope or chain is attached, so that, as the sweep-bar E is carried around, the rope or chain will be wound on the drum, and the stump (which, in practice, is attached, by a stump-chain, to the hook K) will be drawn upward by the action of the traction of the tackle.

The sweep-bar is bent downward, and is of sufficient length to enable the draught-animal hitched to it to pass around the machine.

The upper end of the sweep-bar is set into a socket affixed to the shaft of the drum, and the said socket being formed by the extensions $ff$ from the part G and bands $g\ g$. This socket is of cast or wrought iron; usually the former.

$r\ r$ is a coupling-clutch, sliding on the shaft of the drum, and held from turning thereon by means of ribs, $s\ s$, on the said shaft, which fit in corresponding slots in the coupling-clutch.

Projections from the clutch encounter corresponding projections on the flange-plate $l$ of the drum, as shown.

The clutch is lifted from engagement by a lever, $k$, having a handle, $j$, conveniently accessible to the attendant.

This clutch is brought into engagement with the drum by its weight, and is disengaged therefrom to permit the extracted stump to be lowered to the ground.

The lever $k$ is pivoted on the pintle or rod $t$, projecting from the edge of the upright, $d$, as shown.

The forward ends of each base-beam are provided with a roller-attachment, which consists of a clevis, $m$, having a roller, $n$, and hooks $p$ and $o$, as shown. When the machine is to be drawn to another location, the clevises are turned on its pivot-bolt, to bring the rollers under the base-beams.

This turning under of the said rollers is accomplished by hitching a chain on the hooks $p$, and hitching the team to the chain. The draught-strain will turn the rollers under, and hold them in that position.

The hooks $o$ are used when the rollers are to be thrown out from under the base-beams.

$h\ h\ h\ h'$ are four auxiliary iron braces, to keep the base-beams from spreading.

The machine is placed over the stump to be extracted, so that a vertical strain is brought to bear on it.

The frame is bolted together by vertical and lateral bolts, as shown, and is capable of sustaining any vertical strain to which it is likely to be subjected.

Having thus described my invention, I claim as new, and desire to secure by Letters Patent—

1. The combination, in a stump-extracting machine, of a trestle-frame, constructed as described, with the tackle, drum, and sweep-bar, when arranged and operating substantially as shown and described.

2. The coupling-clutch $r\ r$, and its accessory mechanism, when arranged to operate substantially as described, in combination with the drum, tackle, sweep-bar, and trestle-frame, all as set forth.

3. The clevises $m$, rollers $n$, and hooks $p$ and $o$, substantially as described, in combination with the stump-extractor above described, for the purpose set forth.

T. J. BOOTH.

Witnesses:
I. P. BECK,
DANIEL GOODLANDER.